UNITED STATES PATENT OFFICE.

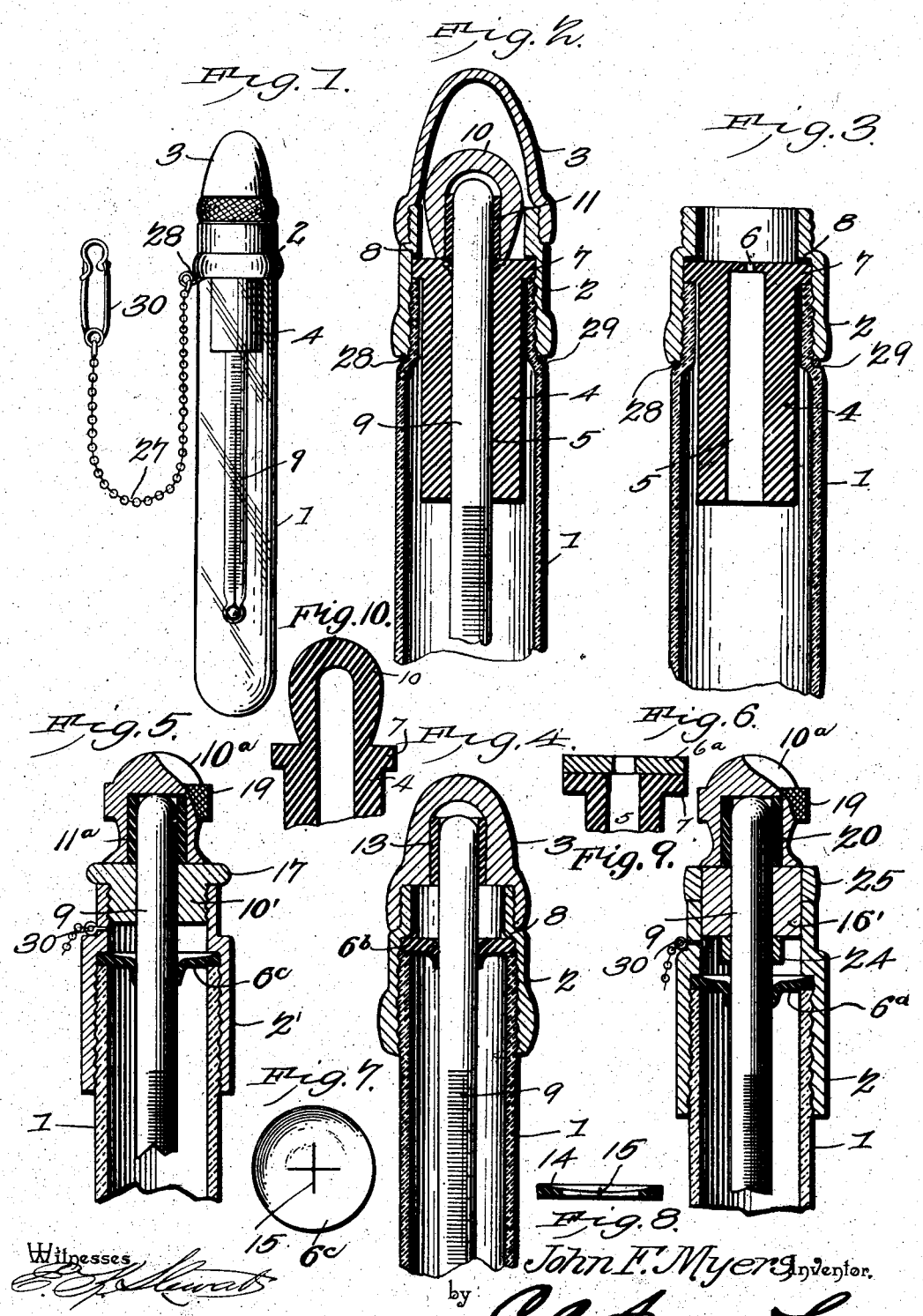

JOHN F. MYERS, OF SODUS, NEW YORK.

CLINICAL-THERMOMETER CASE.

No. 824,038. Specification of Letters Patent. Patented June 19, 1906.

Application filed March 24, 1902. Serial No. 99,790.

*To all whom it may concern:*

Be it known that I, JOHN F. MYERS, a citizen of the United States, residing at Sodus, in the county of Wayne and State of New York, have invented a new and useful Clinical-Thermometer Case, of which the following is a specification.

This invention relates to clinical thermometers, and has for its principal object to provide a novel form of thermometer-case arranged to contain a liquid antiseptic and of such construction as to prevent the escape of the antiseptic when the thermometer is withdrawn.

A further object of the invention is to provide means for supporting the thermometer within the case in such manner as to prevent contact between the thermometer and the inner wall of the case.

A still further object of the invention is to provide a thermometer-case with a flexible valve of closure of such construction that as the thermometer is withdrawn from the case the antiseptic will be wiped therefrom and the thermometer may be used without further cleansing.

With these and other objects in view, as will more fully hereinafter appear, the invention consists in certain novel features of construction and arrangement of parts hereinafter fully described, illustrated in the accompanying drawings, and particularly pointed out in the appended claims, it being understood that various changes in the form, proportions, size, and minor details of the structure may be made without departing from the spirit or sacrificing any of the advantages of the invention.

In the accompanying drawings, Figure 1 is a side elevation of a thermometer-case constructed in accordance with the invention, showing the clinical thermometer in position within the case. Fig. 2 is a vertical sectional view of the upper portion of the case, drawn to an enlarged scale, with the thermometer in position. Fig. 3 is a view similar to Fig. 2, with the thermometer removed, the inward-extending flange or collar being shown in the position which it assumes when relieved from pressure of the thermometer. Fig. 4 is a view similar to Fig 2, illustrating a slight modification of the invention. Figs. 5 and 6 are views similar to Fig. 4, illustrating still further modifications of the invention. Fig. 7 is a plan view of a modified form of closure. Fig. 8 is a transverse sectional view of the same. Figs. 9 and 10 are sectional detail views of two modified forms of closures.

Similar numerals of reference are employed to indicate corresponding parts throughout the several figures of the drawings.

Referring to Figs. 1, 2, and 3 of the drawings, 1 designates the body portion of the case, 2 the detachable head, and 3 the cap or cover. The body may be made of any material suitable for the purpose; but owing to the corrosive qualities of the antiseptic usually employed it is preferred to make the body of glass. The lower portion of the body is closed, and the upper portion is provided with external screw-threads to be engaged by internal screw-threads formed in the head. Within the upper portion of the body is arranged a combined closure and valve 4, constituting also a wiper, which is made of any non-porous yieldable material, preferably rubber, and the closure is provided with a centrally-arranged bore or channel 5, the upper terminal of which is constricted to present an inwardly-extending lip or flange which will fit closely around the thermometer and will act as a wiper to remove the antiseptic from said thermometer as the latter is withdrawn from the case. This flange-closure also serves to prevent the escape of the antiseptic when the case is lying flat on its side after the thermometer has been removed. The combined closure and valve is in this instance produced by forming the upper terminal thereof with an inwardly-extending annular flange 6, which, being yieldable, permits the passage of the thermometer in both directions and after the removal of the thermometer is practically closed, the opening left being of such diameter as to prevent the escape of the antiseptic. It is obvious that instead of forming the flange integral with the main body 4 of the closure the flange may be formed of a separate member 6ª, as shown in Fig. 9. The bore 5 of the closure is of approximately the same diameter as that of the thermometer, presenting a yielding cushion, which serves to hold the thermometer out of engagement with the inner wall of the case. The upper portion of the closure is provided with a marginal flange 7, adapted to bear upon the upper edge of the mouth of the body and be clamped thereagainst by an annular shoulder 8, formed on the inner wall of the head 2, and as the latter has a threaded connection with the body it may be screwed tight for the purpose of compressing the flange, and thereby forming a seal to prevent the escape of the antiseptic. The upper portion of the head is provided with external screw-threads to be engaged by internal threads on the cap 3.

The thermometer 9, which may be of any desired construction, carries at its upper end a rounded knob 10, which may be made of vulcanized rubber or other suitable material and secured to the thermometer by an interposed packing 11, which may be a suitable cement, such as plaster-of-paris, an adhesive substance, or a soft-rubber collar, and in many instances the latter will be preferred, as it will establish a yielding connection between the knob and thermometer, which will operate to shield the latter against breakage when being withdrawn from the case.

By the employment of the knob 10 it will be unnecessary for the user to handle the thermometer by the fingers, thereby lessening the possibility of the transmission of disease-germs or septic matter to the mouth of the patient.

When using the form of thermometer just described, the cap 3 is first removed and the knob 10 is grasped by the fingers of the operator and the thermometer withdrawn from the body of the case, in which act, as before pointed out, the antiseptic will be wiped from the thermometer.

From a standpoint of cleanness and lightness it is preferred that the head and cover be made of gutta-percha; but it is to be understood that these parts may be made of metal and still be within the scope of the invention. In the form of embodiment of the invention shown in Fig. 4 the closure and valve are in the form of a flat central perforated diaphragm $6^b$, which is positively clamped in position by the annular shoulder 8 of the head in the manner already described and operates in precisely the same manner to strip the thermometer of the antiseptic and prevent the escape thereof when the thermometer is lying flat, the orifice and the diaphragm being made of a diameter considerably less than that of the thermometer for that purpose. It is obvious that, if preferred, the opening of the diaphragm may be formed in the same manner as the bore of the closure shown in Fig. 3—that is to say, it may be smaller on the upper side of the diaphragm than on the lower side, and as this will be readily understood it is not thought necessary to specifically illustrate the same. Instead of having the thermometer detached from the cap or cover, as shown in Fig. 2, the same is attached thereto, as by a filling $11^a$, of cement, an adhesive, or by a collar of yielding material, such as rubber, and this cap performs the same function as the cap 10 in preventing contact between the fingers of the operator and the thermometer.

In the form of embodiment of the invention shown in Fig. 5 the valve or closure $6^c$ instead of being provided with an orifice is provided with two slits 15, disposed at right angles to each other, as shown in Fig. 7, and when the thermometer is inserted between the slits the tongues formed by said slits will fit snugly against the thermometer and hold it in proper position within the case, and when the thermometer is withdrawn these tongues will operate as wipers to remove the antiseptic clinging to the thermometer and then close the case to prevent escape of the antiseptic. The head 2' is constructed in the same manner as that shown in Figs. 2, 3, and 4, except that its upper end is provided with internal threads instead of the external threads, and these threads are engaged by a plug 10', preferably of hard rubber, having a peripheral flange 17, that bears upon the mouth of the head. The upper end of the thermometer is secured to a knob $10^a$, that preferably is provided with a knurled band 19, said knob being held in place by a filling of cement $11^a$, previously described. In this form of embodiment of the invention the plug 10' is permanently associated with the head—that is to say, when the thermometer is withdrawn by catching hold of the knob $10^a$ the plug remains associated with the head.

In the form of embodiment of the invention shown in Fig. 6 the plug 16' is held in frictional engagement with the inner surface of the head 2 and may be formed of either hard or soft rubber, preferably the latter. The knob $10^a$ is the same as that previously described. In order to hold the plug 16' upon the thermometer when the latter is withdrawn from the case, it is preferred to employ a collar 24, carried by the thermometer and bearing against the under side of the plug; but this is not essential and may be omitted without interfering with the proper operation of the device. To limit inward movement of the plug, a collar 25, preferably of hard rubber, is associated therewith.

The valve or closure $6^d$ shown in Fig. 6 may be of the form shown in Fig. 4 or that shown in Fig. 5. It is obvious that the knob and plug may be made of one piece of rubber, either hard or soft, as shown in Fig. 10.

As a means of connecting or associating the case with the garment of a user a flexible connection in the nature of a chain 27 is provided, one end of which is furnished with a ring 28, adapted to be clamped between the lower end of the head and a shoulder 29 of the body, and the other end is provided with a safety-pin 30, to be hooked into the garment. The shoulder 29 is only shown in the embodiments of the invention exhibited in Figs. 1, 2, and 3; but it is to be understood that it may be employed in connection with the forms of the invention shown in connection with Figs. 4, 5, and 6, and as this will be readily understood detailed illustration thereof is deemed unnecessary.

Instead of employing the ring 28 as a means of associating the chain with the case an eye-bearing pin or staple 30' may be employed, as shown in Figs. 5 and 6, this being connected in any suitable manner with the head—in this instance by upsetting or bending its inner end against the inner wall of the head, as clearly shown in Fig. 6. By the employment of the attachment danger of spilling or wasting of the antiseptic will be obviated and loss of the instrument will be prevented. Generally the attachment will be preferred; but it is to be understood that it may be omitted without departing from the spirit of the invention.

It will be seen from the foregoing description that the thermometer-cases herein described provide effectively and practically for the elimination of danger of transmission of disease-germs and that the arrangements defined are simple of construction and may be readily applied to thermometers of this class now on the market.

Having thus described the invention, what is claimed is—

1. A thermometer-case comprising a body, a resilient closure projecting thereinto and having a bore for the reception of the thermometer, said closure having an inward-extending portion forming a valve and being further provided with a flange bearing upon the mouth of the body, and means for clamping the flange against the mouth.

2. A thermometer-case comprising a body portion having a plug-like closure provided with a bore and having a constricted portion constituting a valve, and being further provided with a flange to engage the mouth of the body, a member provided with means to clamp the flange against the said mouth, and a cap or closure carried by the member.

3. The combination with a thermometer-case, of a closure provided with an orifice and forming a valve, said closure bearing against the mouth of the case, a ring surrounding the upper end of the body and having a fastening device flexibly connected therewith, and a head for securing the closure and ring in fixed position against the case.

4. A thermometer-case comprising a body provided at its upper portion with threads, a resilient closure forming a valve and bearing against the mouth of the body, a head engaging the threads of the body and serving to clamp the closure thereagainst, and a cap detachably connected to the upper portion of said head.

5. A thermometer-case comprising a body provided at its upper portion with threads, a resilient closure forming a valve, and bearing against the mouth of the body, a head engaging the threads of the body and operating to clamp the closure thereagainst, and a knob secured to the upper end of the thermometer, substantially as specified.

6. A clinical thermometer, comprising a casing for containing an antiseptic solution and provided with a head screwed on the upper end of the casing, a closure held on the upper edge of the casing and engaged by an annular shoulder on the head to securely hold the closure in position, the latter having an opening for the passage of the thermometer, and a cap having a connection with the head and to which the upper end of the thermometer is secured, as set forth.

In testimony that I claim the foregoing as my own I have hereto affixed my signature in the presence of two witnesses.

JOHN F. MYERS.

Witnesses:
C. W. GAYLORD,
MERT DUNNING.